(12) United States Patent
Tanizaki et al.

(10) Patent No.: US 8,562,497 B2
(45) Date of Patent: Oct. 22, 2013

(54) MACHINE TOOL

(75) Inventors: Akira Tanizaki, Nanto (JP); Akira Takase, Nanto (JP); Yukio Kawasaki, Nanto (JP); Shiro Murai, Nanto (JP); Kinya Nakamura, Nanto (JP); Fumihiro Kamikonya, Nanto (JP); Yasuo Hasegawa, Nanto (JP)

(73) Assignee: Komatsu NTC Ltd. (JP)

( * ) Notice: Subject to any disclaimer, the term of this patent is extended or adjusted under 35 U.S.C. 154(b) by 878 days.

(21) Appl. No.: 12/532,734

(22) PCT Filed: Feb. 26, 2008

(86) PCT No.: PCT/JP2008/053294
§ 371 (c)(1),
(2), (4) Date: Sep. 23, 2009

(87) PCT Pub. No.: WO2009/041078
PCT Pub. Date: Apr. 2, 2009

(65) Prior Publication Data
US 2010/0202848 A1    Aug. 12, 2010

(30) Foreign Application Priority Data

Sep. 28, 2007   (JP) ................. 2007-254870

(51) Int. Cl.
| | | |
|---|---|---|
| B23Q 3/157 | (2006.01) | |
| B23Q 1/01 | (2006.01) | |
| B23Q 11/08 | (2006.01) | |
| B23C 1/06 | (2006.01) | |

(52) U.S. Cl.
USPC ............ 483/3; 483/56; 29/560; 29/DIG. 56; 29/DIG. 94; 29/DIG. 102; 409/235; 409/212; 409/134; 409/137

(58) Field of Classification Search
USPC ........... 409/212, 202, 235, 134, 137; 29/560, 29/DIG. 56, DIG. 60, DIG. 94, DIG. 102; 483/3, 54–57; 408/234; 74/608–609
See application file for complete search history.

(56) References Cited

U.S. PATENT DOCUMENTS 2,028,727 A  *  1/1936  Perry et al. ............... 29/560
3,680,438 A  *  8/1972  Good et al. ............ 409/235
(Continued)

FOREIGN PATENT DOCUMENTS

| CN | 1275467 A | 12/2000 |
|---|---|---|
| JP | 61086144 | 5/1986 |

(Continued)

OTHER PUBLICATIONS

International Preliminary Report on Patentability for PCT/JP2008/053294 dated May 4, 2010.

(Continued)

*Primary Examiner* — Erica E Cadugan
(74) *Attorney, Agent, or Firm* — Caesar, Rivise, Bernstein, Cohen & Pokotilow, Ltd.

(57) ABSTRACT

A machine tool including a base frame, a workpiece table, a machining unit, and a connection portion is disclosed. The base frame has a machining area. The base frame includes two left and right side frames and a connection frame connecting the two side frames. The workpiece table is arranged on the base frame in the machining area. The machining unit is arranged on an upper portion of the base frame and includes a spindle device. A connection portion connects the machining unit and the base frame in a detachable manner.

8 Claims, 18 Drawing Sheets

(56) References Cited

U.S. PATENT DOCUMENTS

| | | | |
|---|---|---|---|
| 3,867,054 A * | 2/1975 | Muller | 29/560 |
| 4,218,815 A * | 8/1980 | Cumming | 29/563 |
| 4,566,169 A * | 1/1986 | Vesely | 29/560 |
| 5,893,690 A | 4/1999 | Haninger | |
| 6,364,582 B1 | 4/2002 | Hoppe et al. | |
| 6,519,831 B2 * | 2/2003 | Futamura et al. | 409/230 |
| 6,719,506 B2 * | 4/2004 | Chang et al. | 409/134 |
| 6,798,088 B2 * | 9/2004 | Hsu et al. | 409/212 |
| 7,721,398 B2 * | 5/2010 | Bernhard et al. | 409/212 |
| 8,210,782 B2 * | 7/2012 | Kai | 409/235 |
| 2001/0041651 A1 | 11/2001 | Abe et al. | |
| 2006/0104751 A1 * | 5/2006 | Arai | 29/563 |

FOREIGN PATENT DOCUMENTS

| | | |
|---|---|---|
| JP | 01146631 | 6/1989 |
| JP | 6-24847 U | 4/1994 |
| JP | 10034462 | 2/1998 |
| JP | 2001198751 | 7/2001 |
| JP | 2002028832 | 1/2002 |
| JP | 2002-137143 A | 5/2002 |
| WO | WO-2006/100898 A1 * | 9/2006 |

OTHER PUBLICATIONS

Office Action dated Jul. 14, 2010 for corresponding Chinese Application No. 200880010276.0.

Office Action from JP 2007-254870 dated Jun. 5, 2012.

International Search Report for PCT/JP2008/053294 mailed Apr. 22, 2008.

* cited by examiner

MACHINE TOOL

FIELD OF INVENTION

The present invention relates to a machine tool that facilitates changing of machine type by exchanging a base frame or a machining unit with one of a different specification.

BACKGROUND OF THE INVENTION

In the prior art, patent document 1 proposes a machining center. In this machining center, a double column is arranged to extend laterally over a bed. A spindle head (spindle device) is mounted on the upper portion of the column in a manner that it is movable in the vertical direction and the lateral direction. The spindle head includes a spindle to which a tool is attached in a detachable manner. A table is arranged on the upper surface of the bed to support workpieces.

Patent document 2 proposes a vertical type machine tool. The vertical type machine tool includes upright side walls formed integrally with left and right sides of the bed. A cross-rail extends between the upper portions of the two side walls. A saddle is mounted on the cross-rail so as to be movable in a reciprocative manner in an X axis direction (lateral direction) and a Y axis direction (longitudinal direction). Further, a spindle head, which includes a spindle, is mounted on the saddle so as to be movable in a Z axis direction (vertical direction).

In the machining center described in patent document 1, the bed and the column form a base frame. The spindle head, a movement mechanism that moves the spindle head, and a rotary mechanism that rotates the spindle form a machining unit. In the machining center of patent document 1, the base frame and the machining unit are formed in an inseparable manner. This results in a shortcoming. That is, the base frame or the machining unit cannot be easily exchanged. Thus, when changing machine types, the entire machining center must be changed.

Like the machining center disclosed in patent document 1, the vertical type machine tool disclosed in patent document 2 is not formed so as to facilitate exchanging of the base frame or the machining unit and thus has the same shortcoming as the machining center of patent document 1.

[Patent Document 1] Japanese Laid-Open Patent Publication No. 61-86144
[Patent Document 2] Japanese Laid-Open Patent Publication No. 1-146631

DISCLOSURE OF THE INVENTION

It is an object of the present invention to provide a machine tool that facilitates separation of a machining unit from a base frame and facilitates changing of machine type by exchanging the base frame or the machining unit with one of a different specification.

To achive the above object, one aspect of the present invention provides a machine tool including a base frame, a workpiece table, a machining unit and a connection portion. The base frame has a machining area, in which the base frame includes two left and right side frames and a connection frame connecting the two side frames. The workpiece table is arranged on the base frame in the machining area. The machining unit is arranged on an upper portion of the base frame, in which the machining unit includes a spindle device. The connection portion connects the machining unit and the base frame in a detachable manner.

BRIEF DESCRIPTION OF THE DRAWINGS

The invention will be described in conjunction with the following drawings in which like reference numerals designate like elements and wherein:

FIG. 15($b$) is a cross-sectional view taken along line 15$b$-15$b$ in FIG. 15($a$) and showing a front portion of a machine cover and a work load/unload apparatus.

DETAILED DESCRIPTION OF THE PREFERRED EMBODIMENTS

A first embodiment of a vertical type machine tool according to the present invention will now be discussed with reference to FIGS. 1 to 6.

Figure 1:
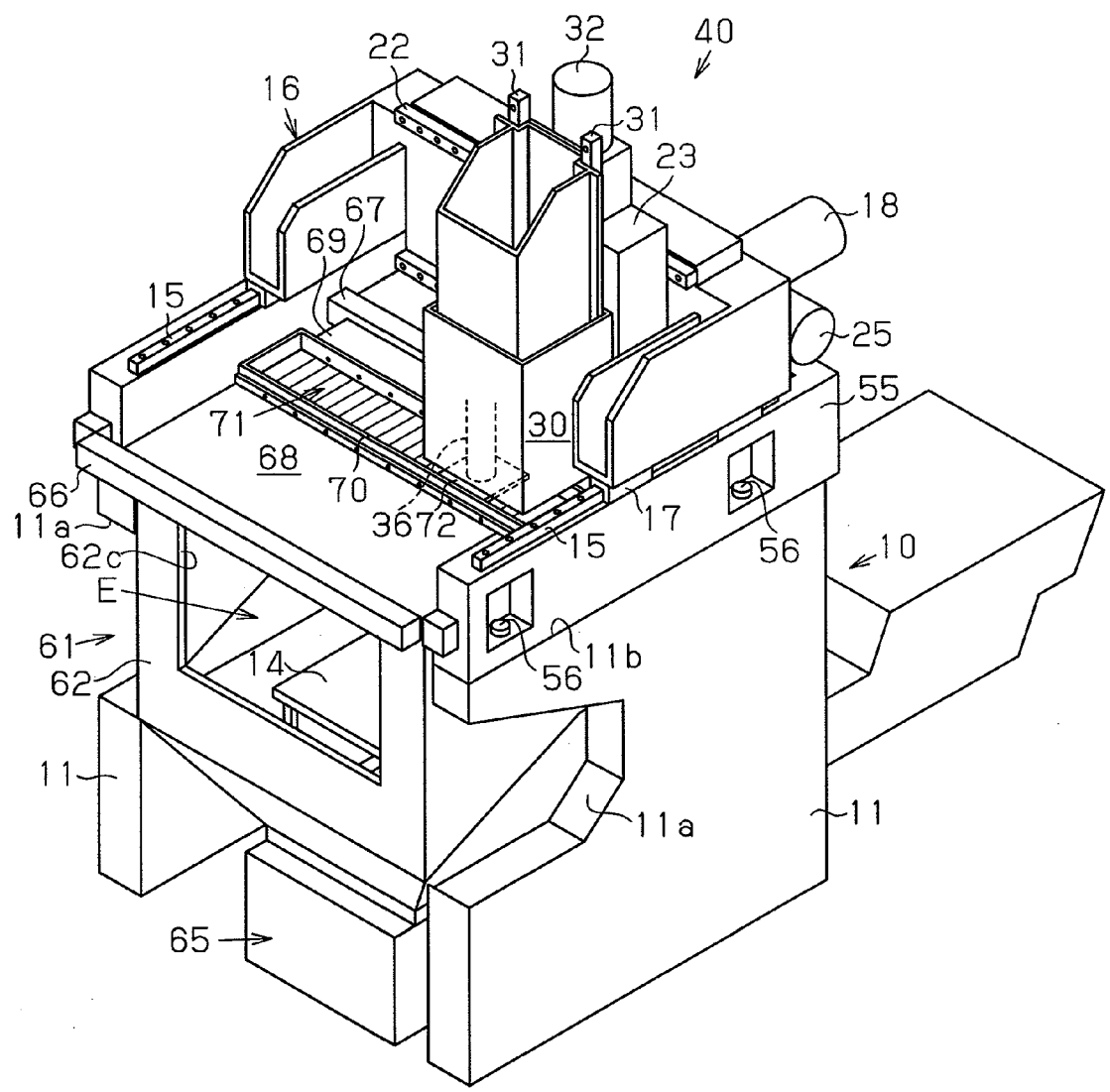
FIG. 1 is a perspective view showing a first embodiment of a machine tool according to the present invention.
Figure 2:
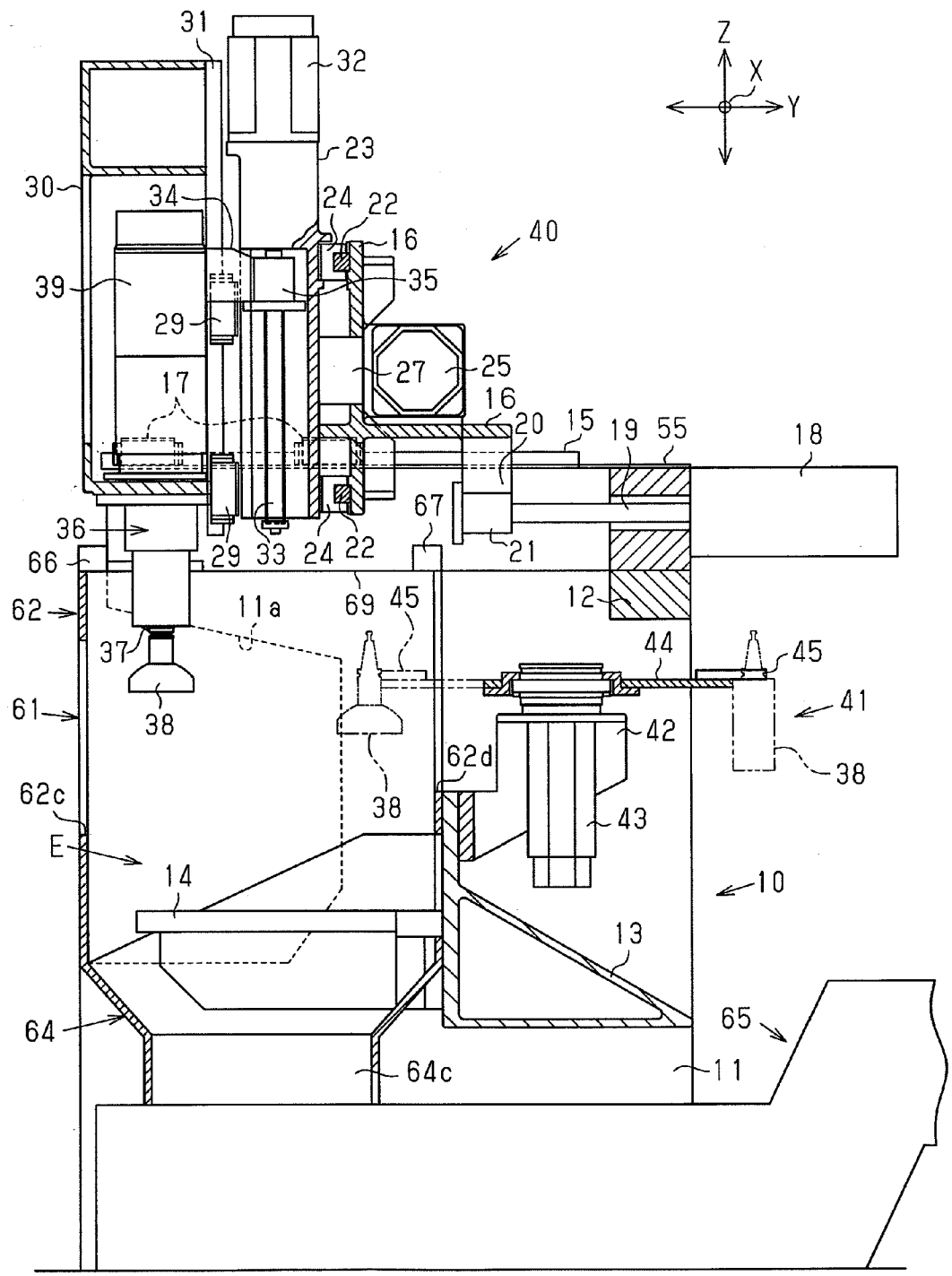
FIG. 2 is a cross-sectional side view taken along a central portion of the machine tool shown in FIG. 1.

As shown in FIGS. 1 and 2, the machine tool of the first embodiment includes a base frame 10, a machining unit 40, a tool changer 41, a machining area cover 61, and a chip recovery apparatus 65. The machining unit 40 is mounted in a detachable manner on the top surface of the base frame 10. The tool changer 41 is mounted on the base frame 10. The machining area cover 61 is arranged in a machining area E defined at the inner side of the base frame 10. The chip recovery apparatus 65 is arranged under the machining area cover 61.

Figure 4:
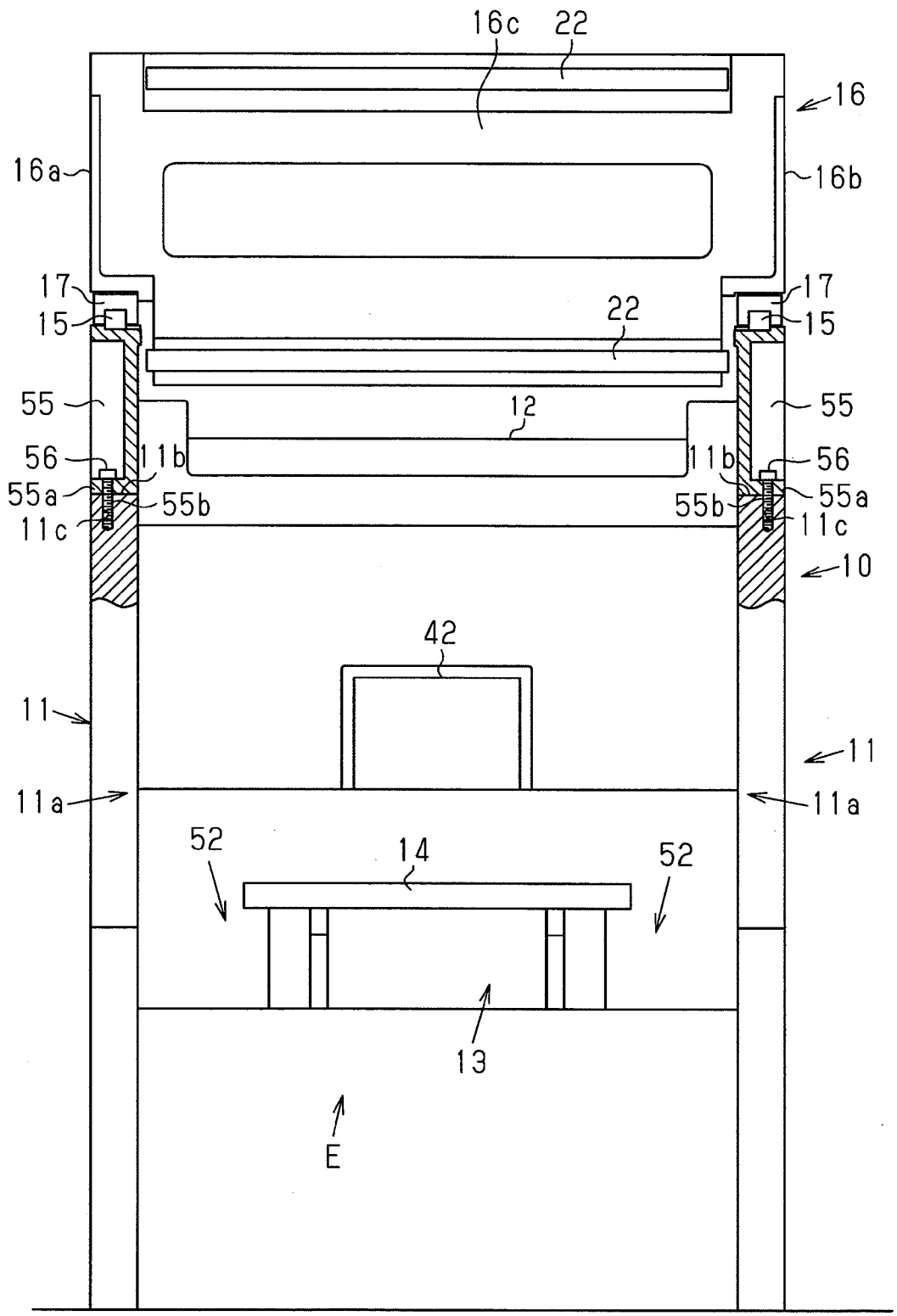
FIG. 4 is a front view showing a base frame, machining frame, and Y axis saddle of the machine tool shown in FIG. 1.

As shown in FIGS. 1 and 4, the base frame 10 includes two parallel left and right side frames 11, an upper connection frame 12 serving as a connection frame and integrally connecting the upper portions of the two side frames 11 so as to bridge the two side frames 11, and a lower connection frame 13 serving as a connection frame and integrally connecting the vertically middle portions of the two side frames 11 so as to bridge the two side frames 11. The machining area E, which is open in the vertical direction, is defined in front of the lower connection frame 13 between the two side frames 11. A workpiece table 14, which is for supporting workpieces, is attached to the front surface of the lower connection frame 13. As shown in FIG. 1, a cutaway portion 11a is formed in the front portion of each side frame 11 to allow for workpieces to be loaded onto and unloaded from the workpiece table 14 by a workpiece transfer apparatus, which is not shown in the drawings.

The machining unit 40 is mounted in a detachable manner on mounting surfaces 11b defined on the top ends of the side frames 11 of the base frame 10. Referring to FIG. 4, a plurality of threaded holes 11c are formed in each of the mounting surfaces 11b. A machining frame 55, which is generally U-shaped when viewed from above in the state shown in FIG. 1, is fastened at a plurality of locations by a plurality of bolts 56. As shown in FIG. 4, bolt insertion holes 55b are formed in flanges 55a, which are formed in the lower portion of the machining frame 55. The bolts 56 are inserted through the bolt insertion holes 55b and fastened to the corresponding threaded holes 11c. In this embodiment, the threaded holes 11c of the side frames 11, the flanges 55a of the machining frame 55, the bolt insertion holes 55b, and the bolts 56 form a connection means (connection portion) for connecting the side frames 11 and the machining frame 55.

Referring to FIG. 1, two parallel Y axis guide rails 15 are laid out horizontally in the Y axis, or longitudinal direction, on the left and right upper surfaces of the machining frame 55. A Y axis saddle 16 is mounted on the two Y axis guide rails 15 by means of sliders 17 so as to be movable in a reciprocative manner in the Y axis direction. Referring to FIG. 2, a Y axis servo motor 18 is integrally fixed to the rear portion of the machining frame 55. The motor 18 has a rotary shaft connected in series with a ball screw 19 by a coupling. The ball screw 19 is engaged with a ball screw nut 21, which is attached to the Y axis saddle 16 by a bracket 20. When the Y axis servo motor 18 rotates the ball screw 19, the nut 21 reciprocates the Y axis saddle 16 in the Y axis direction.

Figure 3:
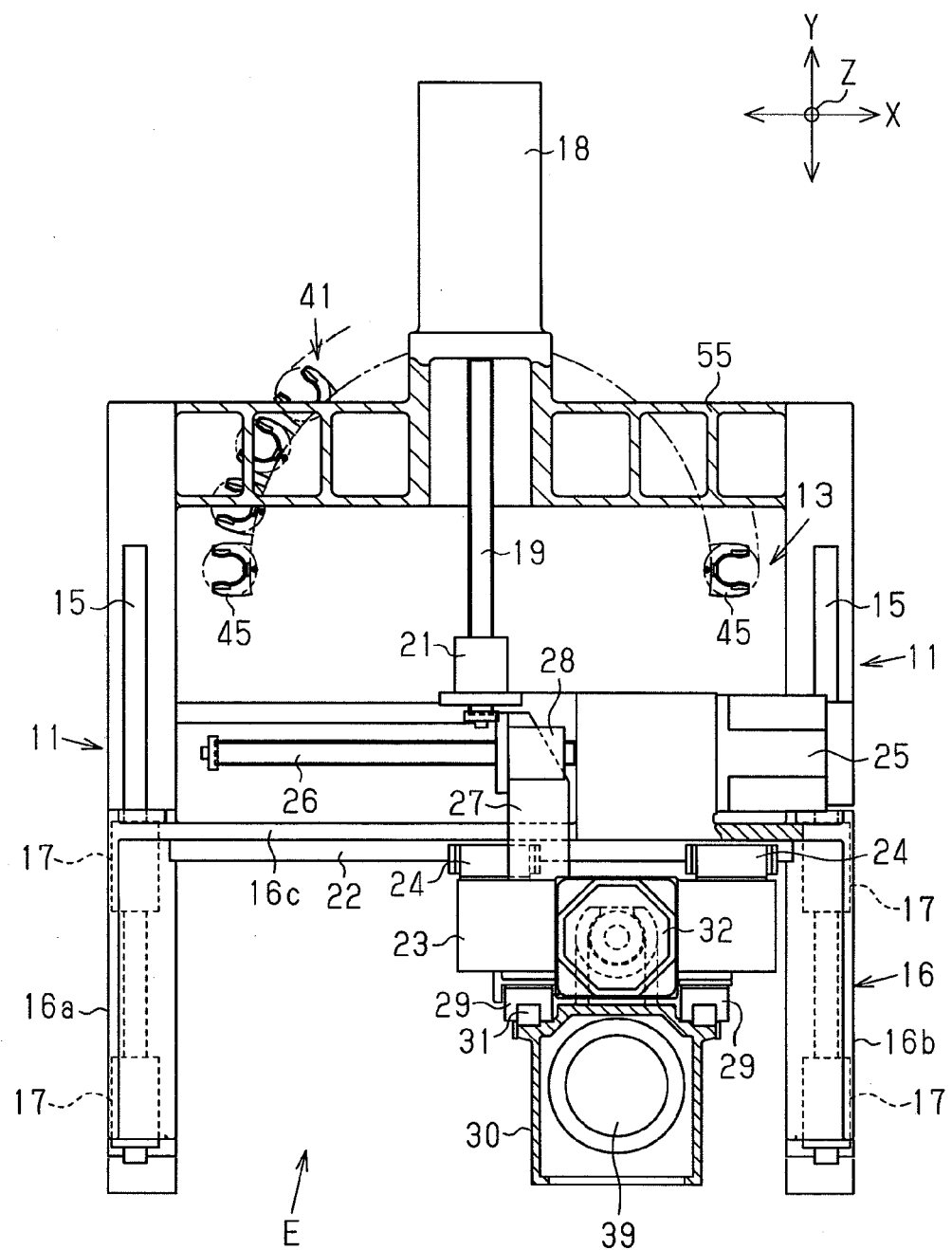
FIG. 3 is a cross-sectional plan view of the machine tool shown in FIG. 1.

Referring to FIGS. 1 and 3, the Y axis saddle 16 is formed to be generally U-shaped when viewed from above by two left and right movable racks 16a and 16b and a movable attachment rack 16c, which is connected to the rear end of the two movable racks 16a and 16b. Parallel upper and lower X axis guide rails 22 are laid out horizontally in the X axis direction, or lateral direction, on the front surface of the movable attachment rack 16c. An X axis saddle 23 is mounted on the X axis guide rails 22 by means of sliders 24 so as to be movable in a reciprocative manner in the X axis direction. As shown in FIG. 3, an X axis servo motor 25 is arranged on the rear surface of the movable attachment rack 16c of the Y axis saddle 16. The motor 25 has a rotary shaft connected to a ball screw 26 by a bracket 27. The ball screw 26 is engaged with a ball screw nut 28, which is attached to the X axis saddle 23 by a bracket 27. When the X axis servo motor 25 rotates the ball screw 26, the nut 28 reciprocates the X axis saddle 23 in the X axis direction.

Referring to FIGS. 2 and 3, two left and right guide members 29 are attached to the front surface of the X axis saddle 23 and directed in the Z axis direction (vertical direction). Each guide member 29 is attached to a Z axis guide rail so as to be movable in a reciprocative manner in the Z axis direction. The two left and right Z axis guide rails 31 are laid out parallel to each other so as to extend in the Z axis direction at the rear left and right sides of a Z axis saddle 30. A Z axis servo motor 32 is arranged on the upper end of the X axis saddle 23. The motor 32 has a rotary shaft connected to a ball screw 33 by a bracket 34. The ball screw 33 is engaged with a ball screw nut 35, which is attached to the Z axis saddle 30 by a bracket 34. When the Z axis servo motor 32 rotates the ball screw 33, the nut 35 reciprocates the Z axis saddle 30 in the Z axis direction.

A spindle device 36 is mounted facing downward on the Z axis saddle 30. The spindle device 36 has a spindle 37, the lower end to which a tool 38 is attached to machine a workpiece. A servo motor 39 is mounted on the Z axis saddle 30 to rotate the spindle 37. In this embodiment, the machining frame 55, the Y axis saddle 16, the Y axis servo motor 18, the X axis saddle 23, the X axis servo motor 25, the Z axis saddle 30, the Z axis servo motor 32, the spindle device 36, the servo motor 39 and the like form the machining unit 40.

As shown in FIG. 2, a tool changer 41, which is for exchanging the tool 38 attached to the spindle 37, is mounted on the rear surface of the lower connection frame 13. A servo motor 43, which is mounted facing upward on the lower connection frame 13 by a bracket 42, includes a rotary shaft to which a magazine 44 is supported in a pivotal manner about a vertical axis. As shown in FIG. 3, a plurality of tool grips 45 are attached to the peripheral portion of the magazine 44 in a semicircular manner. Each tool grip 45 holds a corresponding tool 38 together with a tool holder. The servo motor 43 rotates the magazine 44 to arrange a predetermined tool grip 45 at a tool exchange position. Further, the Y axis servo motor 18, the X axis servo motor 25, and the Z axis servo motor 32 are operated to move the spindle device 36 in each of the X, Y, and Z axis directions so that a used tool 38 is directly exchanged with a new tool 38 between the spindle device 36 and the magazine 44.

Figure 5:
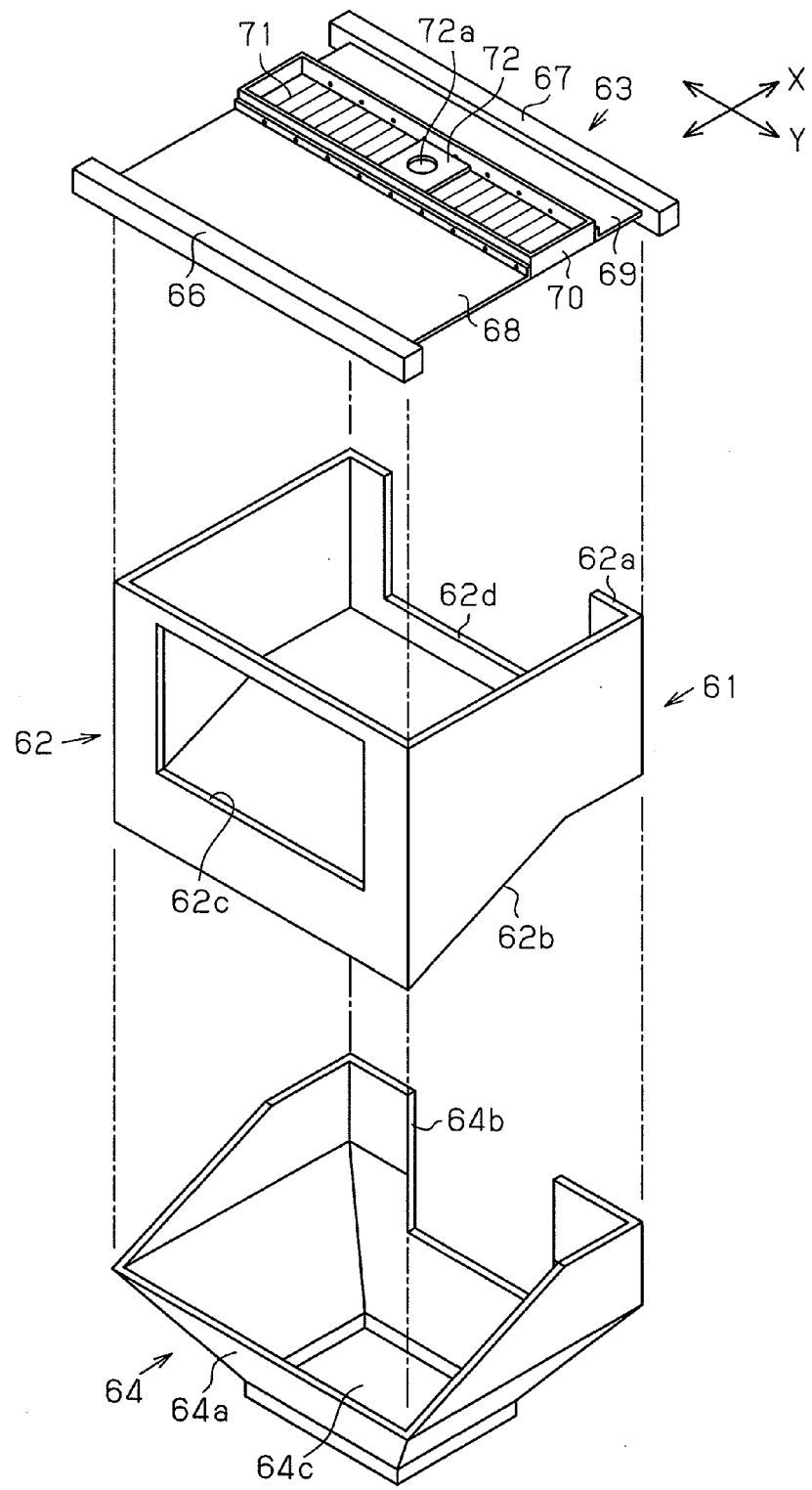
FIG. 5 is an exploded perspective view showing a machining area cover of the machine tool shown in FIG. 1.

The machining area cover 61 is mounted on the base frame 10 and the machining frame 55 as shown in FIGS. 1 and 2 so as to close the machining area E from the exterior. As shown in FIG. 5, the machining area cover 61 includes a substantially tetragonal box-shaped main cover 62, a top cover 63 closing an open top end 62a of the main cover 62, and a chute-shaped lower cover 64 connected to an open bottom end 62b of the main cover 62 so as to allow for cutting chips and coolant to fall into the chip recovery apparatus 65.

The main cover 62 has a front plate including a front window 62c, which is closed by a door (not shown) when a workpiece is machined and which opens to allow for the loading and unloading of a workpiece. Further, the main cover 62 has a rear plate including a rear window 62d, which is closed when a workpiece is machined and which opens when exchanging tools to allow for the tool changer 41 to move therethrough. The top cover 63 is attached to the machining frame 55 of the machining unit 40. The top cover 63 includes front and rear horizontal cover fabric accommodation cases 66 and 67, a movable rack 70, a slide cover 71, and a movable attachment plate 72. The movable rack 70 is rectangular when viewed from above, moved in the X axis direction, and connected to the tips of cover fabrics 68 and 69 that are drawn out of the two cases 66 and 67. The slide cover 71 is arranged in the movable rack 70. The movable attachment plate 72 is connected to an intermediate part of the slide cover 71 and moved in the Y axis direction. Further, the movable attachment plate 72 is connected to the bottom end of the Z axis saddle 30 and includes a hole 72a through which the spindle device 36 is inserted to allow for movement in the vertical direction. Thus, the spindle device 36 is movable in the three directions of the X, Y, and Z axes. The slide cover 71 may be a roll cover that uses a cover fabric.

In the first embodiment, the cover fabric accommodation case 66 serves as a front rack body, and the cover fabric 68 serves as a cover sheet forming a cover portion located toward the front of the spindle device 36.

The lower cover 64 includes a chute portion 64a, a cutaway portion 64b, and an opening 64c. The cutaway portion 64b is formed in a rear plate of the chute portion 64a and allows for the entrance of the workpiece table 14. The opening 64c is for dropping cutting chips and the like into the chip recovery apparatus 65.

Figure 6:
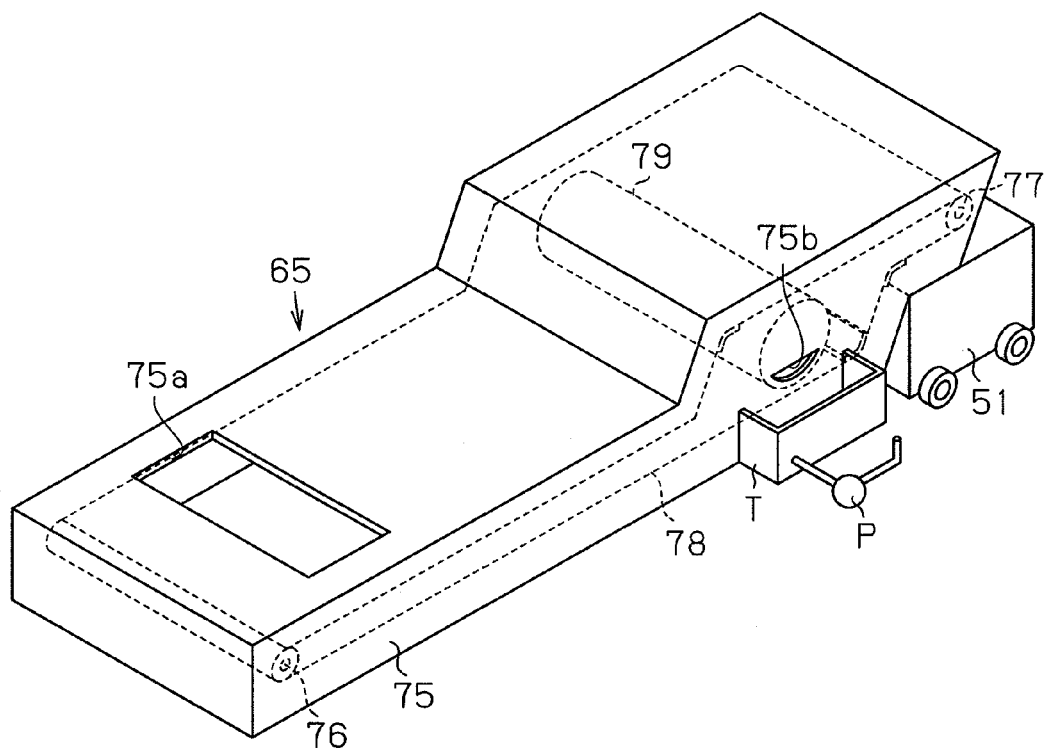
FIG. 6 is a perspective view showing a chip recovery apparatus for the machine tool shown in FIG. 1.

As shown in FIG. 6, the chip recovery apparatus 65 includes a main case 75, a conveyor 78, and a filter 79. The conveyor 78 includes a plurality of vanes (not shown) and extends between two pulleys 76 and 77 arranged in the main case 75. The filter 79 is cylindrical and arranged sideward at the inner side of the conveyor 78 to remove cutting chips from the coolant. Cutting chips fall into the conveyor 78 through an opening 75a formed in an upper plate of the main case 75 and are then conveyed to the rear of the machine tool to be recovered in a chip bucket 51. The coolant filtered by the filter 79 is guided to a coolant tank T from a discharge port 75b formed in a side surface of the main case 75. A pump P sends the coolant from the tank T to a workpiece machining portion of the machine tool.

The operation of the machine tool will now be discussed.

A workpiece is arranged on the upper surface of the workpiece table 14 and clamped at a predetermined position by a workpiece clamp mechanism. The servo motor 39 is operated to rotate the spindle 37. Further, the Y axis servo motor 18, the X axis servo motor 25, and the Z axis servo motor 32 are operated to machine the workpiece with a tool 38. The cutting chips produced when the workpiece is machined are directly dropped into the chip recovery apparatus 65 from a discharge area 52 defined at the periphery of the workpiece table 14.

When a machining task is performed for a predetermined time on the workpiece and it becomes necessary to exchange the tool 38, an opening device (not shown) opens the rear window 62d of the main cover 62. Then, the servo motor 43 of the tool changer 41 is operated to rotate the magazine 44 and arrange a tool grip 45 at a tool exchange position through the rear window 62d. Movement of the spindle device 36 in the three directions exchanges the used tool 38 with a new tool 38.

The vertical type machine tool of the first embodiment has the advantages described below.

(1) In the first embodiment, the entire machining unit 40 is detachably mounted on the mounting surfaces 11b of the side frames 11 in the base frame 10. Thus, the machining unit 40 may easily be exchanged with a machining unit 40 of a different specification. Further, for a standardized machining unit 40, the base frame 10 may easily be exchanged with a base frame 10 of a different specification. Accordingly, the type of machine tool may easily be changed.

(2) In the first embodiment, the machining area cover 61 is arranged in the machining area E of the base frame 10. This prevents the cutting chips produced when a workpiece is machined and coolant from being dispersed outside the machining area E. Further, a cover for the entire machine tool is not necessary.

(3) In the first embodiment, the chip recovery apparatus 65 is arranged at the bottom portion of the machining area cover 61, and the chip bucket 51 is arranged at the distal portion of the chip recovery apparatus. This allows for cutting chips to be recovered by the chip bucket 51, which is arranged rearward from the machine tool.

(4) In the first embodiment, the side frames 11 include cutaway portions 11a. By forming windows (not shown) in the sides of the machining area cover 61 and doors that allows for the windows to open, workpieces may be loaded and unloaded from beside the base frame 10. The cutaway portions 11a may be used as a support for mounting a rotary jig, a chute, or the like.

Second to sixth embodiments of the present invention will hereinafter be discussed in order. In each of the embodiments discussed below, same reference numerals are given to those components that have the same function as the corresponding components of the first embodiment. Such components will not be described in detail.

A second embodiment of a vertical type machine tool according to the present invention will now be discussed with reference to FIGS. 7 to 10.

In the machine tool of the second embodiment, the main cover 62 of the machining area cover 61 includes a front cover plate 73, which is formed separately from the main cover 62. The front cover plate 73 is formed to be slightly large in the leftward, rightward, and upward directions. The front cover plate 73 includes an opening defining a front window 73a for the loading and unloading of workpieces. Doors 81 and 82 open and close the front window 73a. The cover fabric accommodation case 66 and the cover fabric 68 of the top cover 63 move upward in cooperation with the opening movement of the doors 81 and 82 to form an upper open area. This facilitates the removal, attachment, and inspection of a workpiece on the workpiece table 14.

Figure 7:
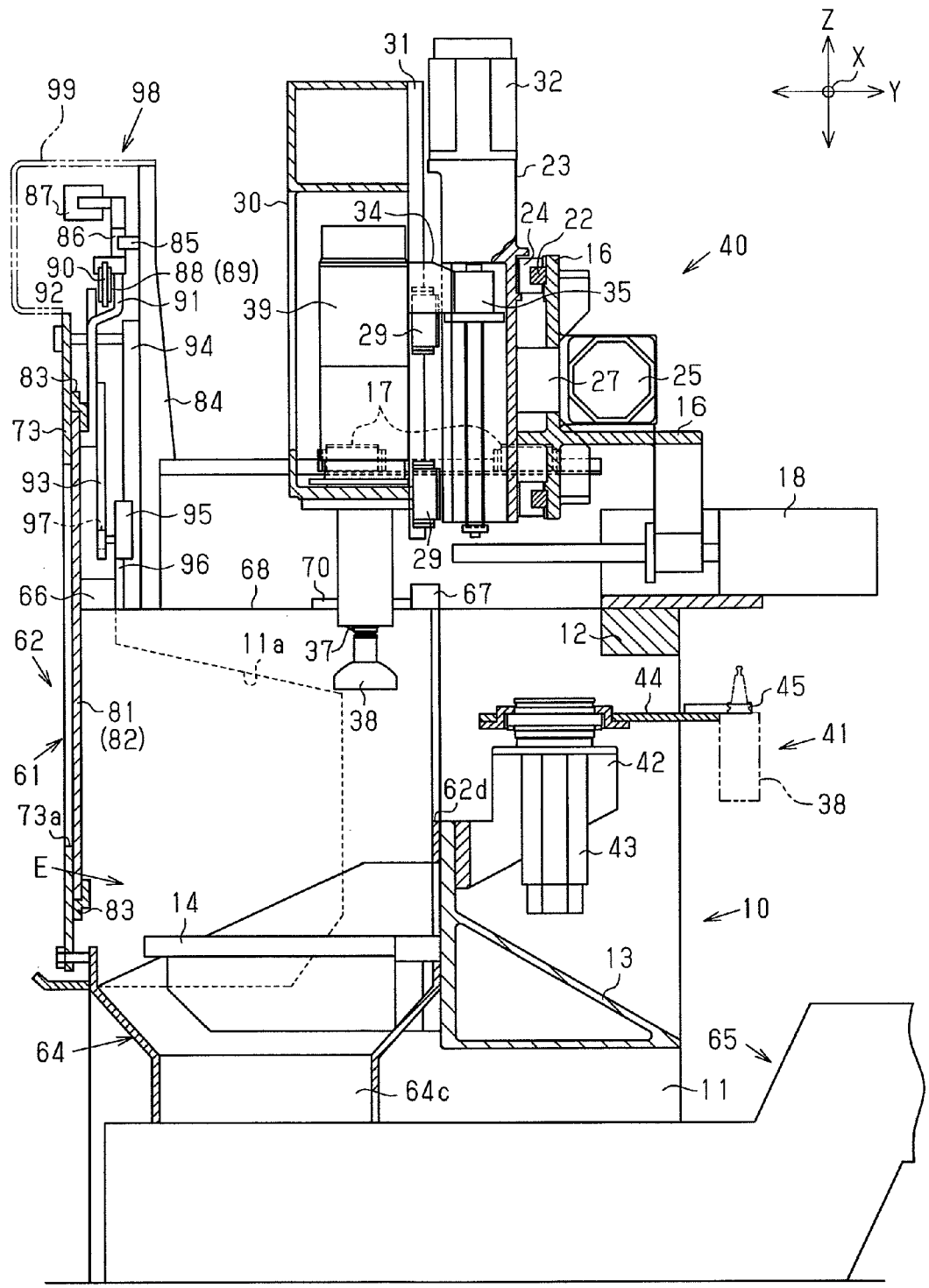
FIG. 7 is a cross-sectional side view showing a second embodiment of a machine tool according to the present invention.
Figure 8:
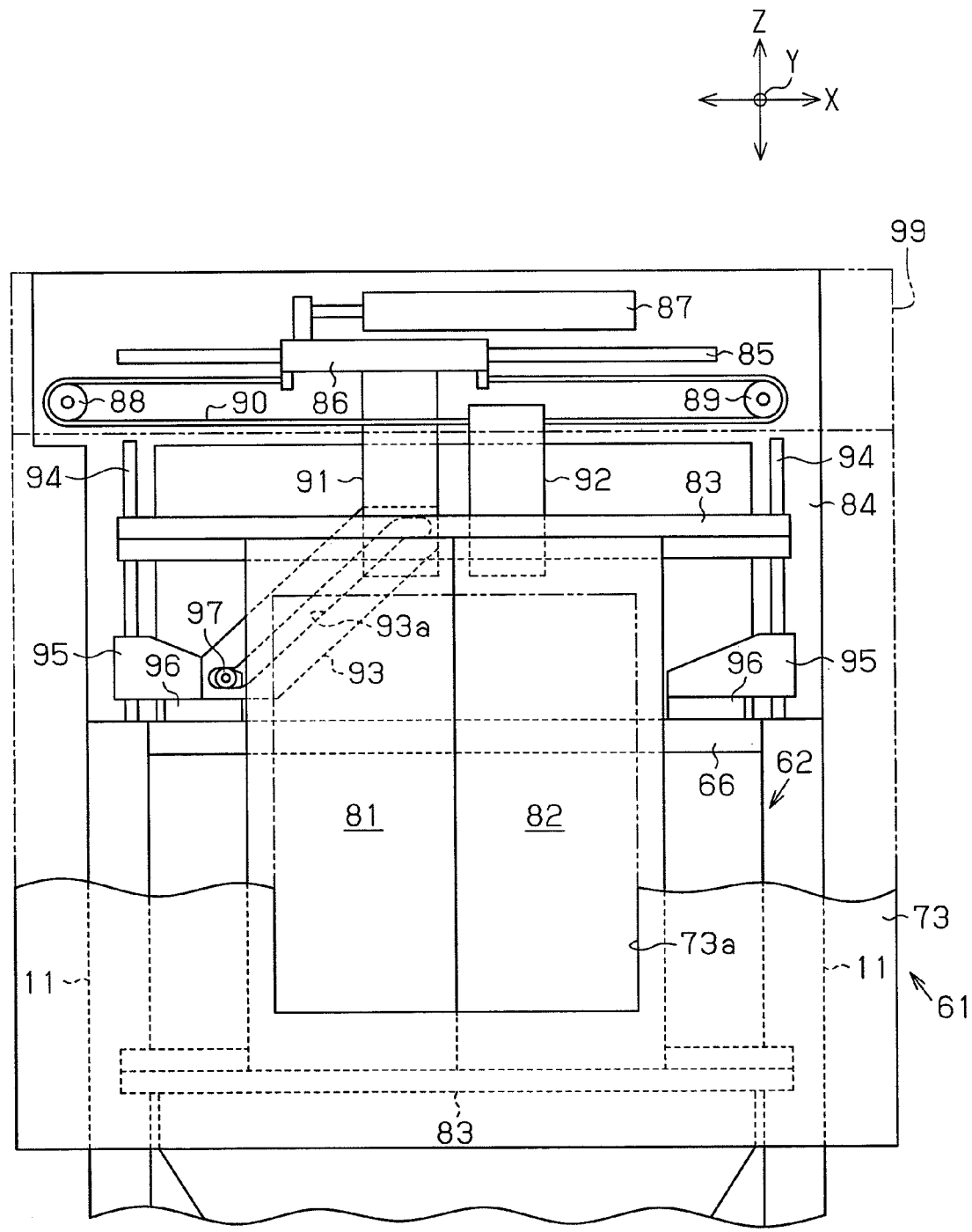
FIG. 8 is a schematic front view showing a door of the machine tool shown in FIG. 7 in a closed state.
Figure 9:
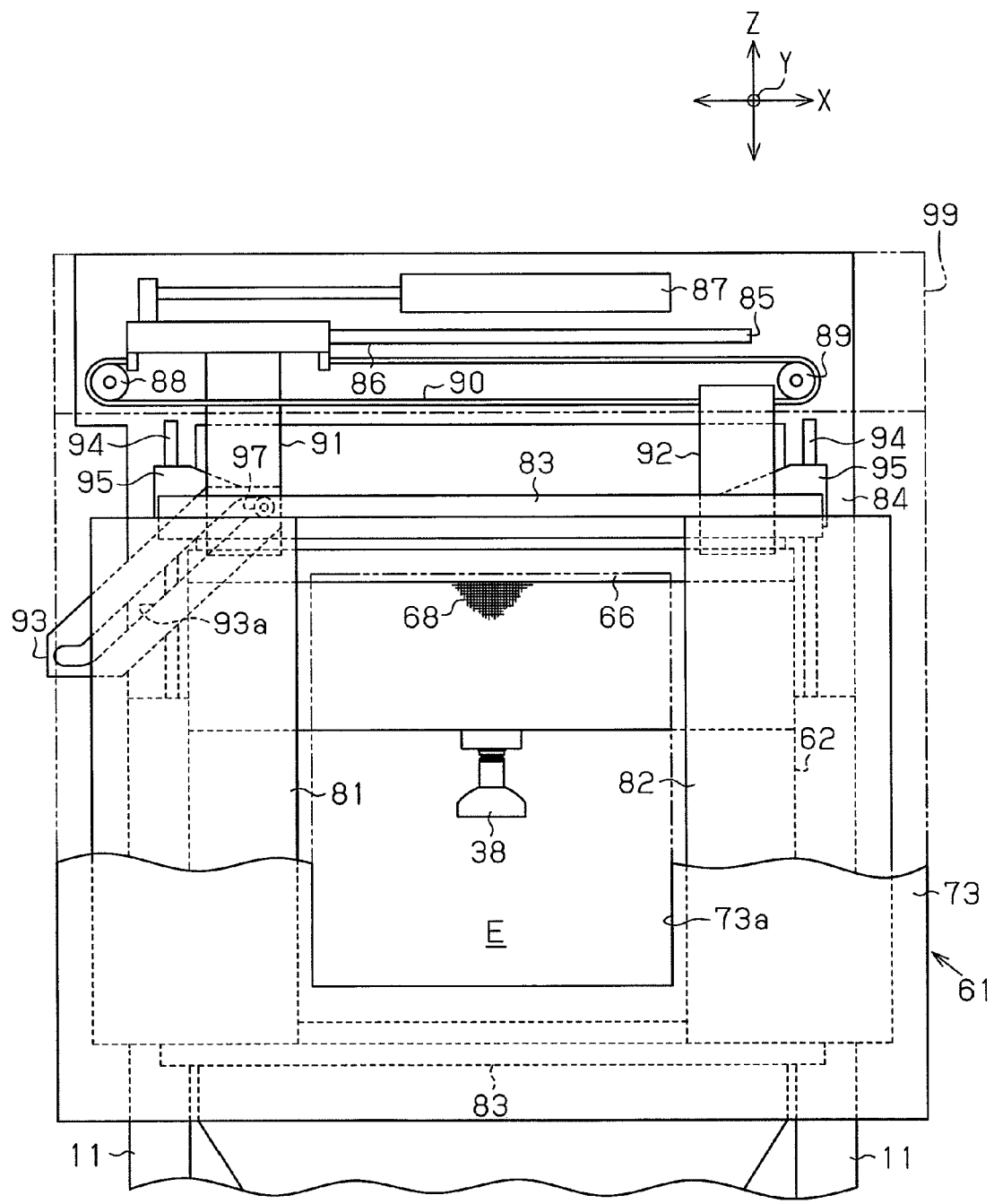
FIG. 9 is a schematic front view showing the door of the machine tool shown in FIG. 7 in an open state.

Referring to FIGS. 7 and 8, the two left and right doors 81 and 82, which open and close the front window 73a of the cover plate 73, are mounted on the front window 73a so as to be movable in a horizontal direction in a reciprocative manner. Two upper and lower X axis guide rails 83 are laid out on the rear surface of the front cover plate 73 so as to extend in the horizontal direction. The top portion and bottom portion of each of the doors 81 and 82 is guided horizontally in the lateral direction by rollers (not shown) along the X axis guide rails 83.

A vertically extending support plate 84 is fixed to the upper surfaces of the two side frames 11. As shown in FIG. 8, an X axis guide rail 85 is laid out horizontally in the lateral direction on the front surface of the support plate 84. An X axis movable body 86 is arranged on the X axis guide rail 85 so as to allow movement in a reciprocative manner. The X axis movable body 86 is reciprocated by the piston rod of a cylinder 87, which is arranged on the support plate 84 extending in the X axis direction. Two left and right sprocket wheels 88 and 89 are attached to the front surface of the support plate 84. A chain 90, which is connected to the two ends of the X axis movable body 86, runs between the sprocket wheels 88 and 89. The X axis movable body 86 is connected to the door 81 by a connection plate 91 and a cam plate 93, which will be described later. The chain 90 is connected to the top portion of a connection plate 92, which is connected to the door 82.

Referring to FIG. 8, two vertically extending Z axis guide rails 94 are laid out at left and right parts of the front surface of the support plate 84. Two Z axis lifters 95, which form a lift guide mechanism lifted and lowered in the vertical direction, are arranged on the Z axis guide rails 94. The Z axis lifters 95 are connected by corresponding connection members 96 to the two ends of the cover fabric accommodation case 66 for the top cover 63. A cam follower 97, which is attached to the left Z axis lifter 95, is engaged with a cam groove 93*a* formed in the cam plate 93, which is connected to the connection plate 91. The cam plate 93 and the cam follower 97 form a cam mechanism. The cam plate 93 is integrally connected to the door 81 at the rear of the door 81.

In the second embodiment, the X axis guide rail 85, the X axis movable body 86, the cylinder 87, the sprocket wheels 88 and 89, the connection plates 91 and 92, the cam plate 93, the Z axis guide rails 94, the Z axis lifters 95, the connection members 96, the cam follower 97, and the like form a synchronizing opening/closing mechanism 98, which synchronizes the opening/closing operation of the cover fabric 68 with the opening/closing operation of the doors 81 and 82. The synchronizing opening/closing mechanism 98 is covered by a protection cover 99, which is attached to the support plate 84, as shown in FIG. 7.

The operation of the second embodiment will now be discussed.

FIGS. 7 and 8 show a state in which the front window 73*a* of the cover plate 73 is closed by the doors 81 and 82, the cover fabric accommodation case 66 is located at a lowermost position, and the cover fabric 68 is held at a horizontal close position, that is, an upper side position of the machining area E. In this state, when the piston rod of the cylinder 87 is extended toward the left, the X axis movable body 86 is also moved toward the left, and the chain 90 is rotated in the counterclockwise direction. Thus, the X axis movable body 86 moves the connection plate 91 toward the left and opens the door 81 toward the left. Further, the chain 90 moves the connection plate 92 toward the right and opens the door 82 toward the right. This opens the two left and right doors 81 and 82 and thereby opens the front window 73*a* of the front cover plate 73.

As the door 81 moves toward the left, the cam plate 93 also moves toward the left. Thus, the cam follower 97 received in the cam groove 93*a* moves diagonally upward along the cam groove 93*a*. This moves the Z axis lifter 95 along the Z axis guide rails 94. As a result, the cover fabric accommodation case 66 of the top cover 63 is lifted upward by the connection member 96, the cover fabric 68 that connects to the cover fabric accommodation case 66 is lifted upward in an inclined state, and an open area above the upper side position of the machining area E is expanded.

The machine tool of the second embodiment has the advantages described below.

Figure 10:
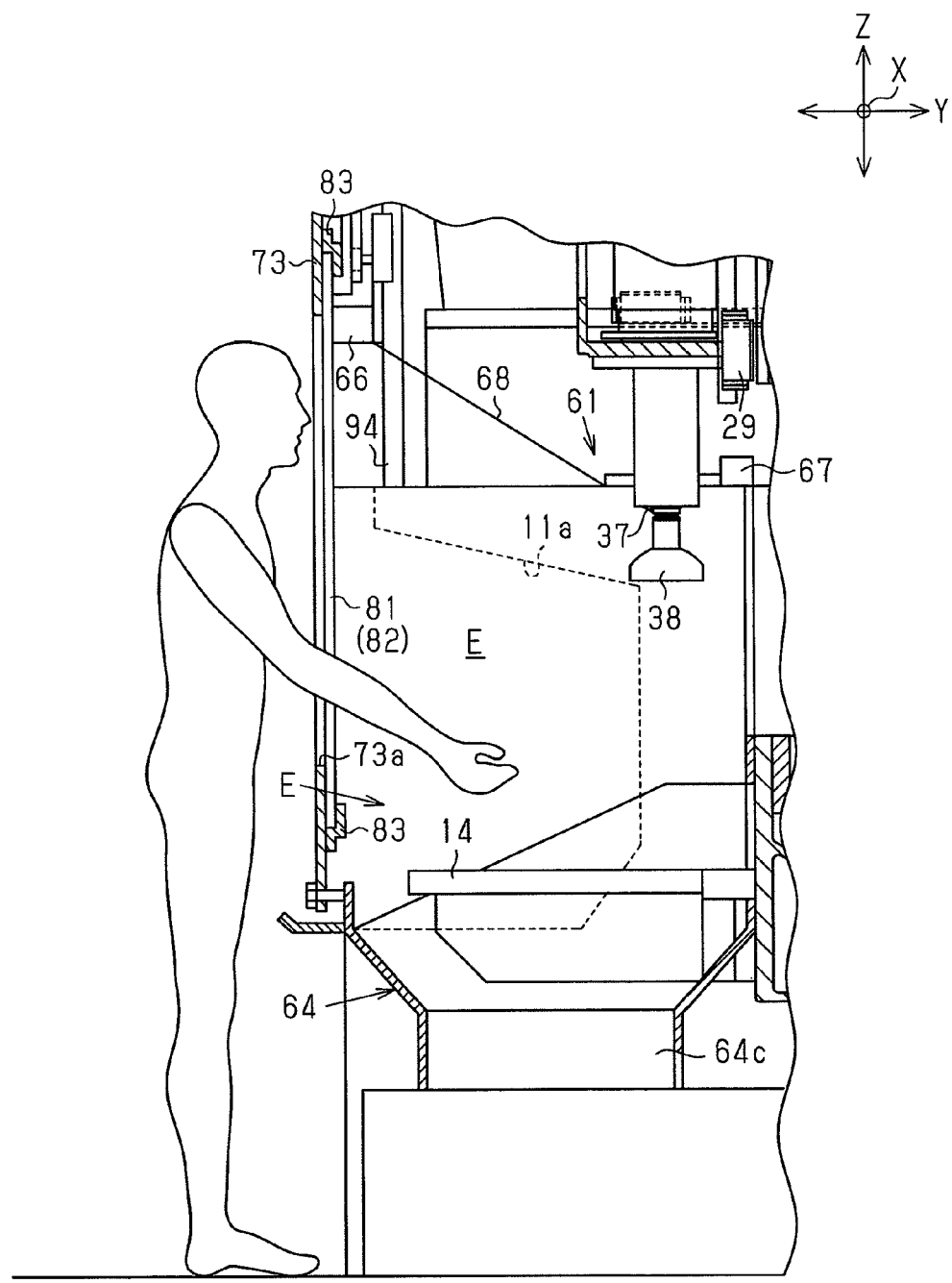
FIG. 10 is a schematic side view showing the door of the machine tool shown in FIG. 7 in an open state.

(1) In the second embodiment, referring to FIG. 10, the front window 73*a* of the front cover plate 73 is lifted upward, and the cover fabric 68 is drawn out and extended in a diagonal state. This forms an open area at the top of the machining area E that expands upward toward the front. This allows for an operator to easily approach the machining area E through the open front window 73*a* without being interfered by the cover fabric accommodation case 66 and the cover fabric 68 to load or unload a workpiece or exchange tools for the spindle 37. Further, there is no need to remove the cover fabric accommodation case 66 and cover fabric 68 of the top cover 63. Thus, the top cover 63 quickly opens upward.

(2) In the second embodiment, the cover fabric accommodation case 66 is lifted upward, and the cover fabric 68 is inclined as shown in the state of FIG. 10. Thus, oil droplets and cutting chips collected on the cover fabric 68 move and fall downward toward the rear along the inclined surface. This reduces the number of times in which oil droplets and cutting chips are manually removed from the cover fabric 68.

(3) In the second embodiment, the same cylinder 87 is used to perform the open operation of the cover fabric 68 in cooperation with the opening operation of the doors 81 and 82.

Thus, the opening and closing of each part may be quickly performed with a single actuator. Further, the components of a drive mechanism may be reduced in number. This facilitates the manufacturing and assembly of the drive mechanism and reduces costs. The present embodiment particularly improves workability for a machine tool that sets the top cover 63 at a low position in order to decrease the height of the machining area E as much as possible.

A third embodiment of a vertical type machine tool according to the present invention applied to a machining system will now be discussed with reference to FIGS. 11 and 12.

Figure 11:
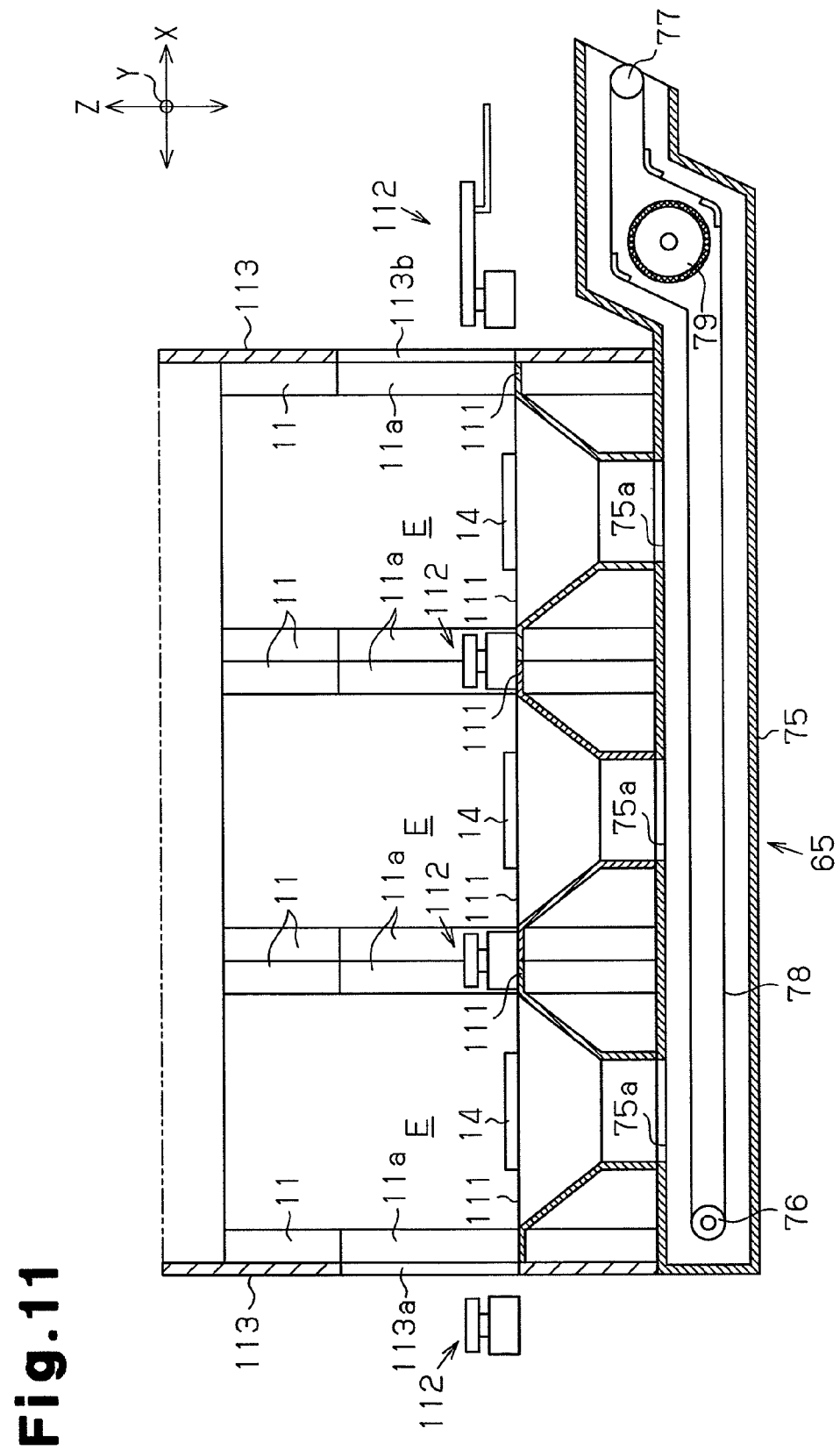
FIG. 11 is a cross-sectional side view showing a third embodiment of the present invention applied to a machining system.
Figure 12:
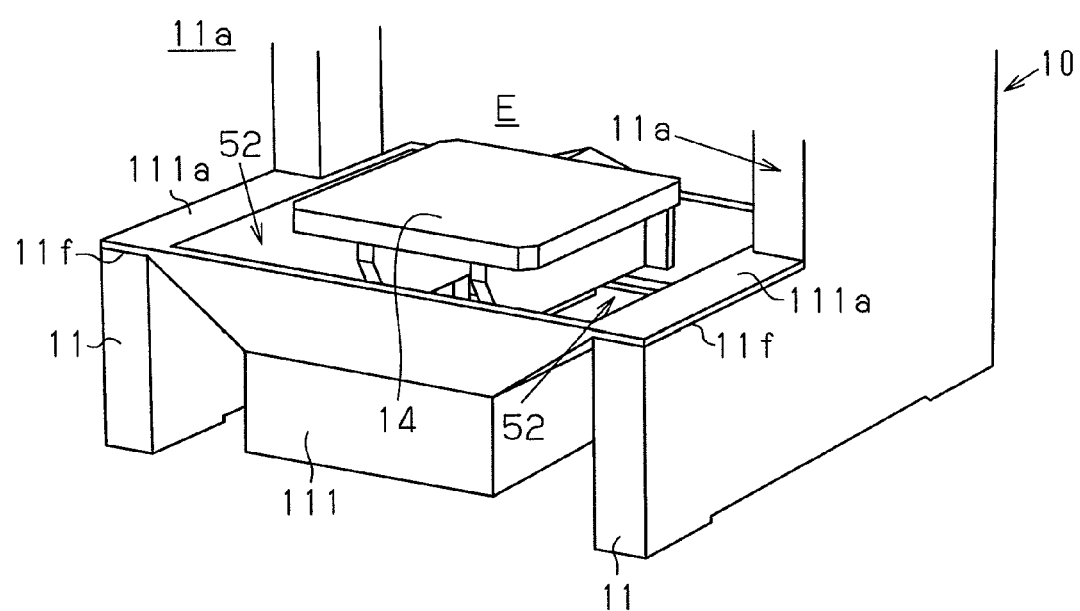
FIG. 12 is a partial perspective view showing a machine tool of FIG. 11.

In this machining system, referring to FIG. 11, a plurality of machine tools are arranged in series along a machining line extending in the X axis direction. In the base frame 10 of each machine tool, one of left and right flanges 111*a* of a chute 111, which is arranged in the machining area E, is supported by a bottom surface 11*f* of the cutaway portion 11*a* in each side frame 11. A common chip recovery apparatus 65 of the machining system extends along a machining line under each machine tool. An upper plate of the main case 75 of the chip recovery apparatus 65 includes a plurality of openings 75*a*, each connected to the bottom of one of the chutes 111.

Each machine tool includes a robot arm type workpiece transfer apparatus 112 to sequentially load and unload workpieces for each machine tool. A machine cover 113 surrounding all of the machine tools is arranged at the outer side of the machine tools. The machine cover 113 includes side covers located at the upstream side and downstream side with respect to the direction in which tasks proceed. The side covers include windows 113*a* and 113*b* that close when workpieces are machined and open when loading and unloading workpieces.

In the machining system of the present embodiment, the chip recovery apparatus 65 is shared by the plurality of machine tools. This allows for the structure of the machining system to be simplified. Further, the machine tools are all covered by the machine cover 113. Thus, the machining area cover 61, which is provided for each machine tool, may be eliminated.

A fourth embodiment of a vertical type machine tool according to the present invention will now be discussed with reference to FIG. 13.

Figure 13:
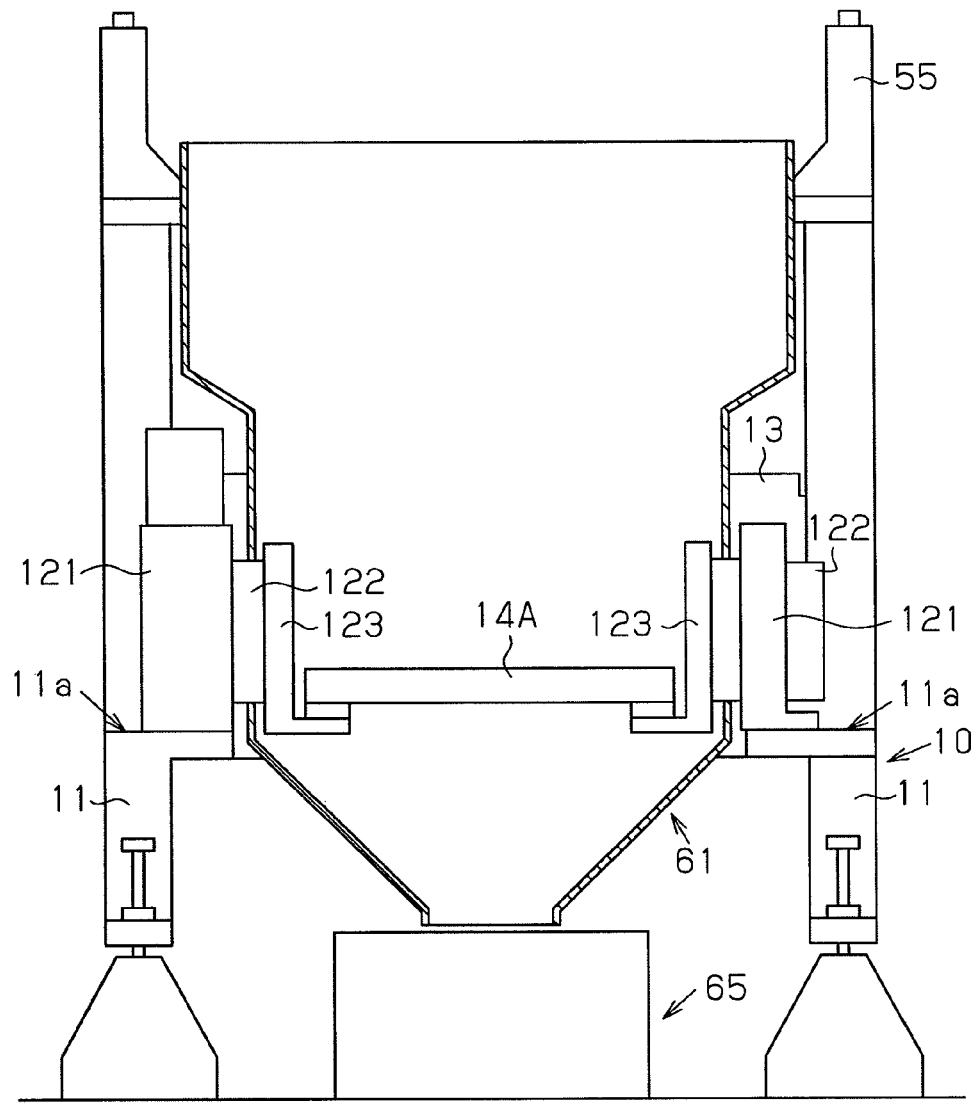
FIG. 13 is a cross-sectional side view showing a workpiece table in a fourth embodiment of the present invention.

In the fourth embodiment, referring to FIG. 13, a rotary base 123 is mounted on the bottom of the cutaway portion 11*a* of each of the two side frames 11. The rotary base 123 is supported by a bearing 121 and rotated in a reciprocative manner by a tilt motor 122 about a horizontal axis. A tilt table 14A, which serves as a workpiece table, is mounted on the two rotary bases 123. A workpiece is held on the tilt table 14A. Although not shown in the drawings, in this embodiment, an index table, which serves as a workpiece table, may be mounted on the tilt table 14A so as to be rotatable about an axis extending perpendicular to the tilt axis.

A fifth embodiment of a vertical type machine tool according to the present invention will now be discussed with reference to FIG. 14.

Figure 14:
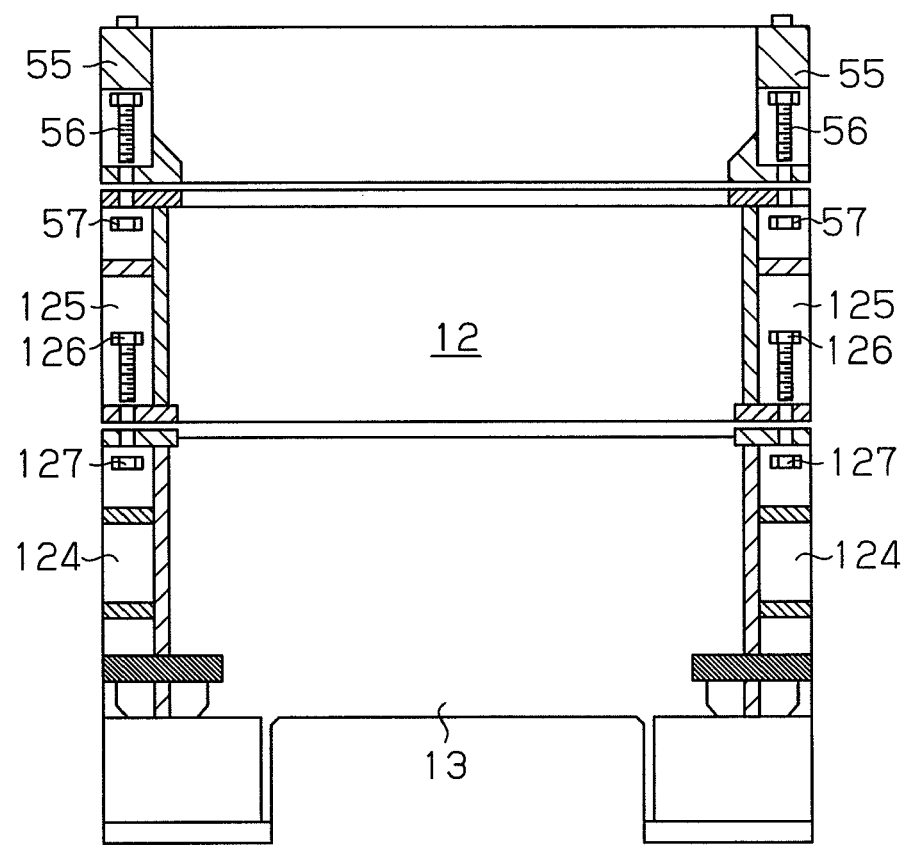
FIG. 14 is a cross-sectional front view showing a separated base frame in a fifth embodiment of the present invention.

In the fifth embodiment, as shown in FIG. 14, each side frame is divided into two in the vertical direction. A lower divisional frame 124 has a top surface to which an upper divisional frame 125 is connected in a detachable manner by bolts 126 and nuts 127.

In this embodiment, the side frame 11 is divided into upper and lower parts. This allows for the height of the side frame 11 to be easily changed.

A sixth embodiment of a vertical type machine tool according to the present invention applied to a machining system will now be discussed with reference to FIGS. 15(a) and 15(b).

Figures 15A, 15B:
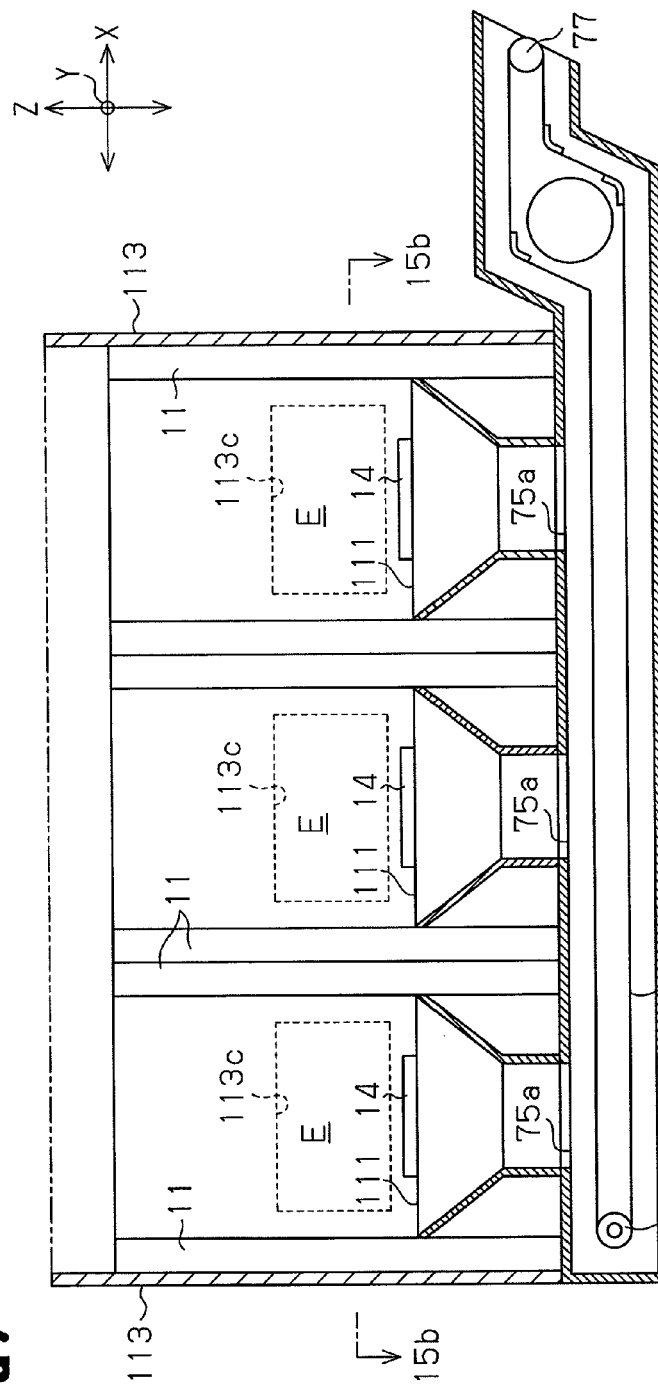
FIG. 15($a$) is a cross-sectional front view showing a sixth embodiment of a machine tool according to the present invention applied to a machining system.

In the sixth embodiment, as shown in FIGS. 15(a) and 15(b), the machining system includes a plurality of workpiece load/unload apparatuses 131, each provided for a machine tool. Each workpiece load/unload apparatus 131 loads and unload workpieces to and from the workpiece table 14 through a window 113c formed in the front surface of the machine cover 113 in correspondence with each machine tool.

A seventh embodiment of a vertical type machine tool according to the present invention will now be discussed with reference to FIGS. 16 to 17(b).

Figure 16:
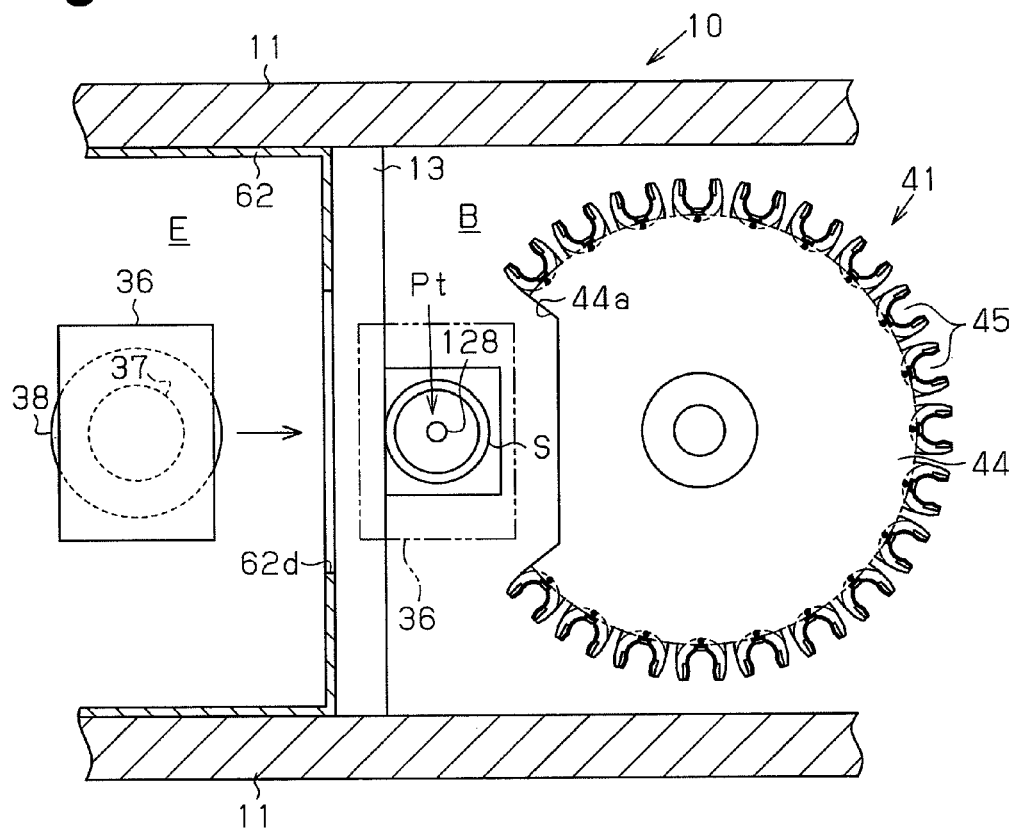
FIG. 16 is a cross-sectional plan view showing a base frame and a tool changer in a seventh embodiment of the present invention.

In the seventh embodiment, referring to FIG. 16, the tool changer 41 is arranged in a rear area B, which is located rearward from the machining area E of the base frame 10, to exchange tools 38. The tool changer 41 includes a plurality of tool grips 45 arranged along the periphery of the tool magazine 44, which is disk-shaped. Part of the magazine 44 defines a cutaway portion 44a, which does not include the tool grips 45. A shutter (not shown) is arranged on the rear window 62d of the main cover 62. The drive mechanism, which moves the spindle device 36 in the Y axis direction, and the top cover 63 are formed so as to move the spindle device 36 to a tool exchange position Pt located in the rear area B in a state in which the shutter is open.

Figure 17A:
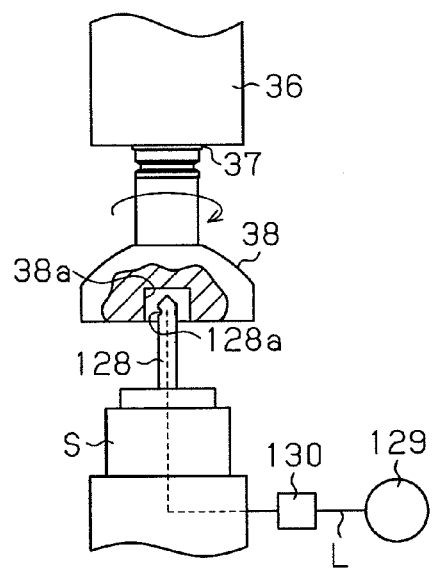
FIGS. 17($a$) and 17($b$) are explanatory diagrams showing a detector that detects abnormal attachment of a tool in the seventh embodiment.
Figure 17B:
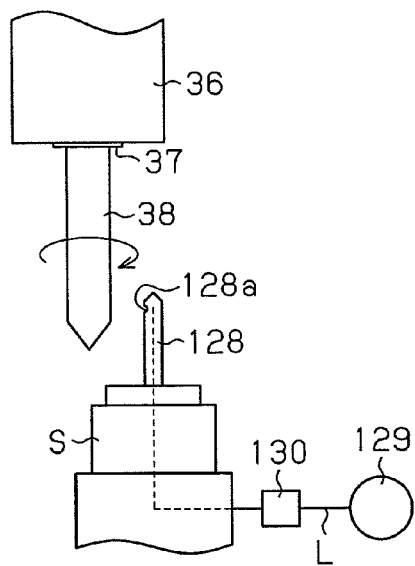

As shown in FIG. 17(a), a detector S is fixed to a lower fastening portion, namely, the lower connection frame 13, in the rear area B near the tool exchange position Pt. The detector S detects whether or not the attachment state of the tool 38 that has newly been attached to the spindle 37 is satisfactory. An air injection nozzle 128, which is directed upward, is connected to the detector S. A compressed air supply source 129 supplies the air injection nozzle 128 with air under a constant pressure through an air pipe L. This injects air out of an injection hole 128a, which is formed in the air injection nozzle 128, in a horizontal direction. Further, a pressure meter 130 is connected to the air pipe L.

In this embodiment, as shown by the broken lines in FIG. 16, after the spindle device 36 undergoes tool exchange in the rear area B, the tool magazine 44 is rotated and the spindle device 36 is moved to a position corresponding to the detector S in a state in which the cutaway portion 44a is located at the tool exchange position Pt. At this position, referring to FIG. 17(a), the tool 38 is moved downward together with the spindle device 36 so that the air injection nozzle 128 becomes located in the center of a recess 38a formed in the central part of the tool 38. In this state, the tool 38 is rotated with the spindle 37, and air is injected toward the inner wall surface of the recess 38a. Further, the pressure meter 130 measures the pressure when the tool is rotated. When the measured pressure fluctuates for more than a reference value, swinging of the tool 38 is detected. This results in determination of the state of the tool 38 attached to the spindle 37 being abnormal, and a warning device (not shown) warns the operator of such a determination. When the tool 38 attached to the spindle 37 is rod-shaped like a drill, as shown in FIG. 17(b), the tool 38 is moved to a position beside the air injection nozzle 128 and rotated. Then, the pressure meter 130 measures pressure fluctuations when the tool 38 is rotated to detect whether or not the attachment state of the tool 38 is satisfactory.

In the seventh embodiment, a detection space is formed for the tool 38 at a location in the cutaway portion 44a of the magazine 44. Thus, there is no need to move away the tool changer 41 toward the rear during detection. Further, when exchanging tools, the spindle device 36 only needs to move over a relatively short distance. Additionally, in the rear area B, tools may be exchanged and the determination of whether the attachment of a tool 38 to the spindle 37 is satisfactory may be performed. Also, in comparison with a structure for detecting the exchanging and attachment state of the tool 38 in the machining area E, the exchanging and detection of a tool may be performed more quickly. Moreover, the attachment state of the tool 38 is detected in the rear area B, which does not collect coolant and cutting chips. This improves the detection accuracy.

The above-described embodiments may be modified as described below.

Figure 18A:
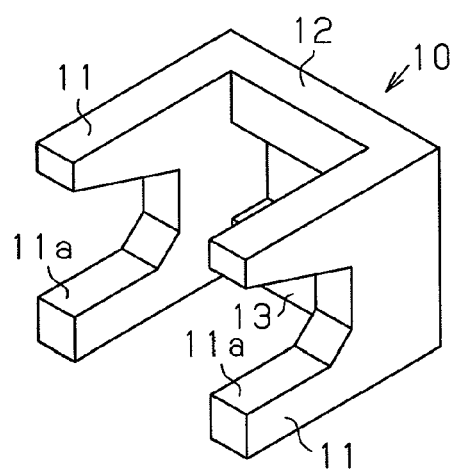
FIGS. 18($a$) to 18($d$) are schematic perspective views showing base frames in further embodiments of the present invention.
Figure 18B:
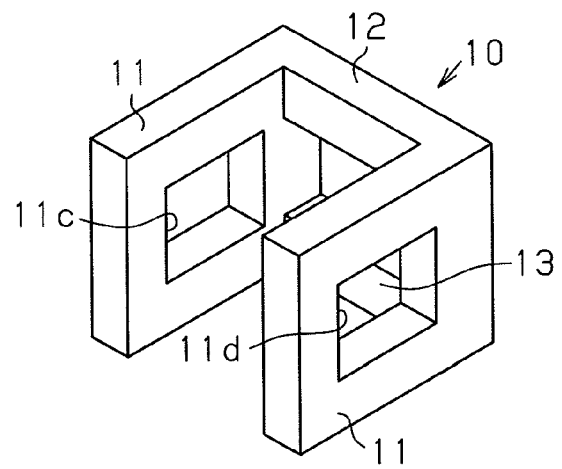

The base frame 10 may be simplified as shown in FIG. 18(a). A window 11d may be formed in each of the side frames 11 as shown in FIG. 18(b). Further, referring to FIG. 18(c), a cutaway portion 11e may be formed in the rear lower portion of each side frame 11 to receive the main case 75 of the chip recovery apparatus 65. Further, in the structure of FIG. 18(c), as shown by the broken lines, the cutaway portions 11a and the windows 11d may be formed. Additionally, as shown in FIG. 18(d), the lower front end of the two side frames 11 may be connected by a connection frame 132. Moreover, as shown by the broken lines in FIG. 18(d), the front side of the two side frames may entirely be connected by a connection frame 133. The connection frame 132 may also be provided for the base frame 10 shown in each of FIGS. 18(a) to 18(c).

Figure 19:
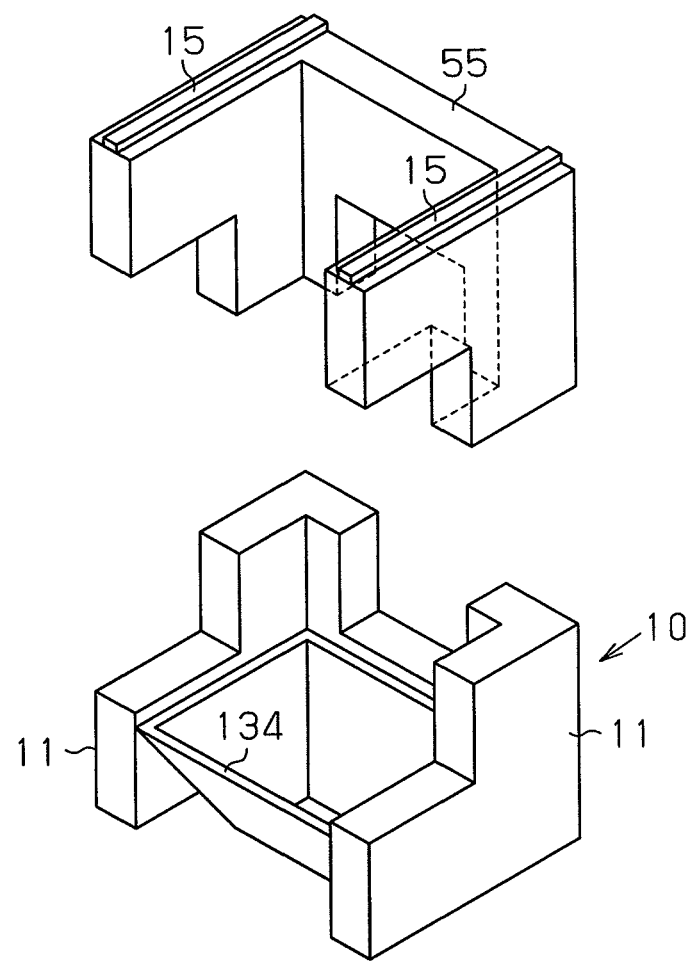
FIG. 19 is a perspective view showing a base frame and a machining frame in a separated state in a further embodiment of the present invention.

Referring to FIG. 19, the side frame 11 may be formed to be step-shaped when viewing the side frame 11 from the side, and the machining frame 55 may have a side frame portion like the base frame 10. The bottom surface of the side frame portion of the machining frame 55 is joined with the top surface of the side frame 11, and the side frame 11 and the side frame portion are connected to each other by, for example, bolts. A chute 134 may be formed integrally with or attached to the base frame 10 in advance, and the workpiece table 14 may be supported so that a cutting chip falling area is formed above the chute 134. In this example, the lower cover 64 may be eliminated from the machining area cover 61.

In the first embodiment shown in FIG. 1, as a device for opening and closing the rear window 62d of the main cover 62, for example, a shutter (not shown) including a door, may be arranged in an opening of the base frame 10, which supports the magazine 44. The shutter, arranged between the machining area for workpieces and the tool changer 41, prevents cutting chips produced in the machining area and coolant from being dispersed toward the tool changer 41.

In the machining area cover 61 of the first embodiment shown in FIG. 5, the main cover 62, the top cover 3, and the lower cover 64 may be formed integrally. Further, the lower cover 64 may be eliminated from the machining area cover 61. In this case, the base frame 10 shown in FIG. 19 is used. Further, the machining area cover 61 may be formed by a combination that is in accordance with the specification, such as by combining the front cover plate 73 with a side cover plate to form the main cover 62.

In the machining area cover 61 shown in FIG. 5, the main cover 62 and the lower cover 64 may each have two left and right side plates including a workpiece load window and a workpiece unload window.

In the second embodiment shown in FIG. 8, instead of the cylinder 87 that opens and closes the doors 81 and 82, another actuator such as a motor may be used.

The cover fabric accommodation case 66 of the top cover 63 is arranged at a position located at the front end of the machining area cover 61 so that the cover fabric 68 can be drawn out of the front end. Instead, the cover fabric accommodation case 66 may be arranged at a position located at the front end of the movable rack 70. In this case, the front rack supports only the front end of the cover fabric 68. In the same manner, the cover fabric accommodation case 67 may be arranged at a position located at the rear end of the movable rack 70.

In the third embodiment shown in FIG. 11, a chip recovery apparatus 65 may be provided for each machine tool.

Figure 18C:
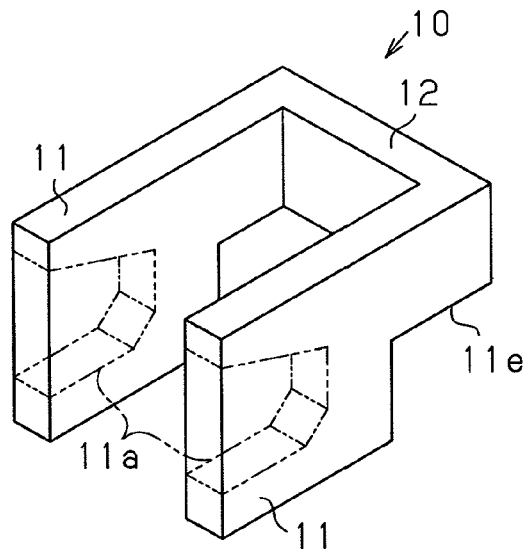
Figure 18D:
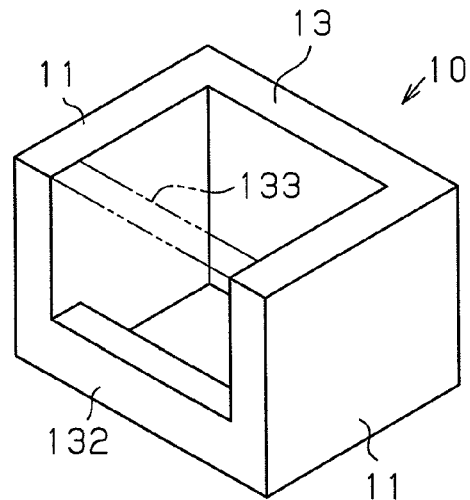

As the base frame 10 of the fourth embodiment shown in FIG. 13, in addition to the type shown in FIG. 18(a), the type shown in FIG. 18(b) or FIG. 18(c) may be used. Further, as the base frame 10 of the sixth embodiment shown in FIG. 15, the type shown in FIG. 18(c) or FIG. 18(d) may be used.

Among the front side, left and right sides, and rear side of the machining area E, the main cover 62 of the machining area cover 61 may be formed to cover at least the front, and a door may be provided for the front window 62c, which opens to allow for the loading and unloading of a workpiece.

Although not shown in the drawings, an index table for supporting a workpiece may be mounted on the lower connection frame 13 so as to be driven by an index mechanism including an index motor to be rotatable about an axis parallel to the Z axis.

The upper connection frame 12 and the lower connection frame 13 may be formed integrally. Otherwise, three or more connection frames may be used.

The workpiece table 14 may be movable in the X axis direction and the Y axis direction, and the spindle device 36 may be movable in only the Z axis direction.

The base frame 10 may be formed to be separable, for example, into the two side frames 11 and one or more connection frames.

While the invention has been described in detail and with reference to specific embodiments thereof, it will be apparent to one skilled in the art that various changes and modifications can be made therein without departing from the spirit and scope thereof.

The invention claimed is:

1. A machine tool comprising:
a base frame including two upright side frames that bound two sides of a machining area located therebetween, in which machining area a workpiece mounted on a workpiece table is machined, the base frame also including a connection frame connecting the two side frames, the workpiece table being arranged on the base frame in the machining area;
a machining unit arranged on an upper portion of the base frame, wherein the machining unit includes a tool spindle device for machining the workpiece mounted on the workpiece table; and
a connection arrangement which connects the machining unit and the base frame in a detachable manner so as to permit the selective detachment and reattachment of the machining unit to the base frame;
the machine tool further comprising a machining area cover arranged in an area formed by the base frame and the machining unit to shield the machining area from an area exterior to the machine tool, wherein the machining area cover includes:
a main cover inside the two side frames and arranged to surround the workpiece table;
a top cover attached in a separable manner to a top edge of the main cover and formed with portions that extend and retract so as to follow movements of the tool spindle device;
a lower cover having a chute-shape and attached in a separable manner to a bottom edge of the main cover.

2. The machine tool according to claim 1, wherein the base frame is formed to be separable into two parts by separation in a vertical direction.

3. The machine tool according to claim 1, wherein the lower cover having the chute-shape is configured to allow cutting chips to fall into a chip recovery apparatus.

4. The machine tool according to claim 1, wherein:
the main cover includes a front window, which opens to load and unload the workpiece, and a door, which opens and closes the front window;
the top cover includes a cover portion;
the cover portion is supported by a horizontal front rack which is arranged to be upwardly movable by a lift guide mechanism by a predetermined distance from an upper side position of the machining area; and
the upward movement of the front rack forms an upper open area through the front window, which upper open area is continuous with the machining area 5. The machine tool according to claim 4, further comprising:
a first mechanism which lifts and lowers the front rack to open and close the cover portion;
a second mechanism which moves the door in horizontal directions to open and close the front window; and
a cam mechanism which connects the first mechanism and the second mechanism to synchronize an opening or closing operation of the door with an opening or closing operation, respectively, of the cover portion.

6. The machine tool according to claim 4, wherein the front rack is an accommodation case which draws in and accommodates a cover sheet that forms the cover portion.

7. The machine tool according to claim 1, wherein a rear area is formed at a position located toward a rear of the machine tool from the workpiece table, the rear area being in communication with the machining area in a manner allowing for the rear area to open and close, wherein the rear area includes a tool magazine which is capable of exchanging a tool with the tool spindle device.

8. The machine tool according to claim 7, further comprising:
a detector which detects a state of attachment of a tool to the tool spindle device, with the tool magazine being disk-shaped and having a peripheral portion including a plurality of tool grips, part of the tool magazine forming a cutaway portion that does not include the tool grips, and the detector being arranged on the connection frame.

* * * * *